United States Patent [19]
Ernst et al.

[11] 3,872,768
[45] Mar. 25, 1975

[54] FASTENING DEVICE

[75] Inventors: Richard John Ernst, Elk Grove Village; George Anton Neumayer, Deerfield, both of Ill.

[73] Assignee: Illinois Tool Works Inc., Chicago, Ill.

[22] Filed: Dec. 20, 1973

[21] Appl. No.: 426,831

[52] U.S. Cl.................................................. 85/3 R
[51] Int. Cl............................................. F16b 37/04
[58] Field of Search................. 85/3 R, 3 S, 3 K, 66

[56] References Cited
UNITED STATES PATENTS

| | | | |
|---|---|---|---|
| 1,247,621 | 11/1917 | Bennett | 85/3 R |
| 2,609,723 | 9/1952 | Stubbs | 85/3 K |
| 2,998,743 | 9/1961 | Apfelzweig | 85/3 R |
| 3,248,994 | 5/1966 | Mortensen | 85/3 R |
| 3,288,014 | 11/1966 | Mortensen | 85/3 R |
| 3,707,898 | 1/1973 | Holly | 85/3 R |

FOREIGN PATENTS OR APPLICATIONS

| | | | |
|---|---|---|---|
| 1,152,070 | 5/1969 | United Kingdom | 85/3 R |

*Primary Examiner*—Marion Parsons, Jr.
*Attorney, Agent, or Firm*—Robert W. Beart; Thomas W. Buckman

[57] ABSTRACT

A fastener attachable to a workpiece which is accessible from only one side. The device will include an elongated body carrying a pivotable toggle member retained therein. Slots in the body member will receive bosses fixed to the toggle allowing the toggle to rotate and be selectively axially located. The slots will include a plurality of axially spaced means to retain the toggle in a position transverse the body and will also include means to initially retain the toggle in a position longitudinal to the body and near the upper extremity thereof to insure that the toggle is actuated with minimum of penetration of the screw in the body and thereby enabling the device to operate regardless of the thickness of a fixture to be attached to the first workpiece.

21 Claims, 6 Drawing Figures

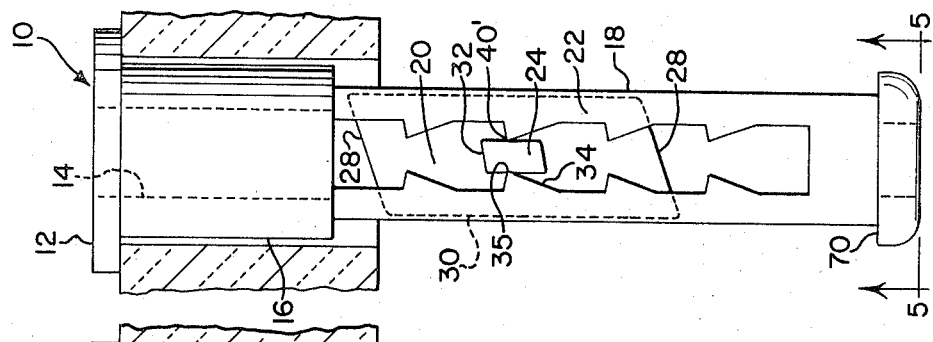
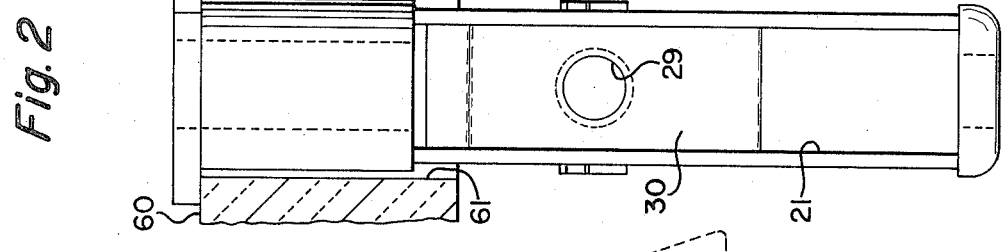
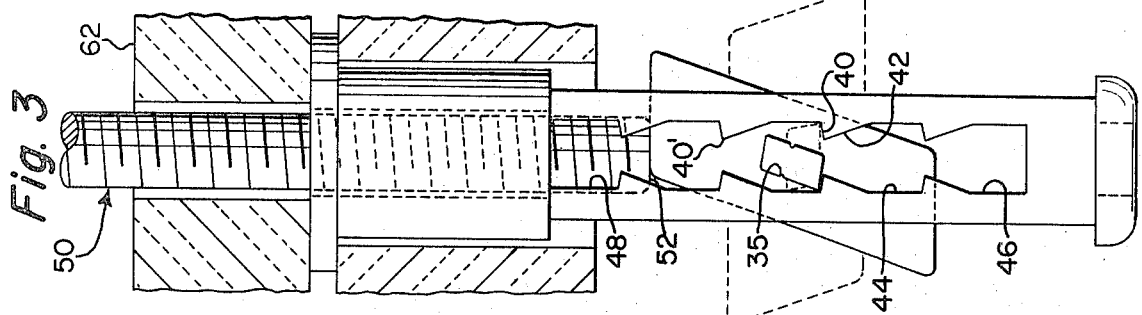
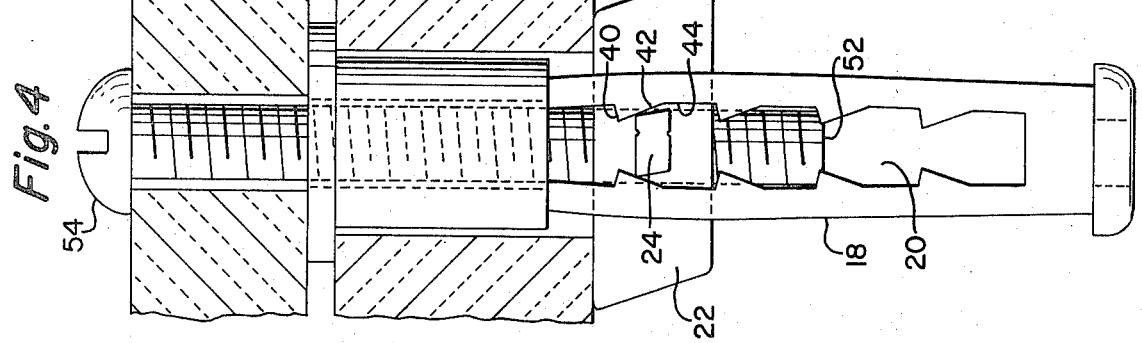
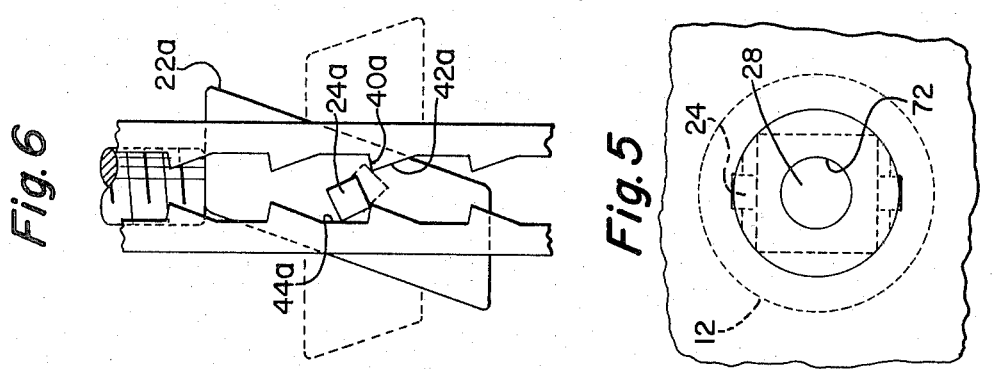

FASTENING DEVICE

BACKGROUND OF THE INVENTION

This invention relates to a device for fastening objects to a workpiece where only one side of the workpiece is accessible.

A number of prior art devices have been developed in which a member carrying a toggle-like element is insertable through a relatively thin workpiece for subsequent activation of the toggle by the insertion of a screw through the member. However, the prior art suffers from several inherent disadvantages. It is difficult to insure that the toggle will be retained in its transverse position after the screw has been removed to replace one fixture with another. Upon reinsertion of the screw in the prior art fasteners, the toggle must be forced all the way to the extremity of the body before the threads on the screw and the internal threads in the toggle will engage. The prior art fasteners are designed to require the screw to extend completely to the extremity of the body before the internal threads of the toggle will engage the threads of the screw. Thus, only a very small range of thicknesses of fixtures may be attached to the primary work-piece. It should be apparent that it would be extremely difficult to completely activate the toggle and engage the toggle with the extremity of the screw when the screw must fasten a very thick fixture without, of course, using a length of screw which is not normally associated with the conventional prior art device.

It is, therefore, an object of the invention to provide a fastener of the type described above that may be used to fasten a relatively large range of thicknesses of fixtures to a primary workpiece which may also be of a relatively large range of thicknesses.

It is still another object of the invention to provide a hollow wall fastener that will allow a fixture to be mounted to the hollow wall with a single insertion of a screw through the fixture and the wall to activate a toggle device and draw it up into clamping engagement with the blind side of the wall.

Yet another object of the invention is to provide a hollow wall fastener in which the toggle element is firmly retained in its transverse position closely adjacent to the clamping surface of the inaccessible side of the workpiece after the removal of a screw member and during the subsequent reinsertion of the screw member.

The above and other objects and advantages are obtained by the fastener device of the present invention which includes an elongated hollow body member having a flange at one extremity and including a pair of slots extending along the length of the body member. An elongated toggle member having a threaded aperture extending transverse to its length is pivotally retained within the body member by generally elongated bosses each received in one of the elongated slots. The slots will include a plurality of restricted portions and enlarged portions selectively allowing the boss to rotate in any one of a plurality of axially spaced locations and be retained in a transverse position in any of the spaced locations. The slot will further include means permitting the toggle to be pulled upwardly from its transverse position to any position closer to the flange extremity of the body to insure a tight clamping engagement with the inaccessible bearing surface of the workpiece.

BRIEF DESCRIPTION OF THE DRAWINGS

FIG. 1 is a side elevational view of the fastener device embodying the invention positioned through a suitable workpiece, such as wall board.

FIG. 2 is a side elevational view similar to that of FIG. 1 but showing the fastener device rotated 90° to that of FIG. 1.

FIG. 3 is a side elevational view of a fastener device showing the attachment of a fixture to the wall and the initiation of rotation of the toggle member.

FIG. 4 is a side elevational view similar to FIG. 3 showing the toggle element in a fully transverse position and clampingly engaging the undersurface of the wall board.

FIG. 5 is an end view taken along lines 5—5 of FIG. 1.

FIG. 6 is a partial side view similar to FIG. 3 showing another embodiment of the pivot and retention bosses of the invention.

DESCRIPTION OF THE PREFERRED EMBODIMENT

In the illustrated embodiment, the fastener device 10 comprises an elongated body member with a flange 12 at one extremity and a toggle retaining portion 18 forming the other extremity. A generally cylindrical sleeve portion is positioned immediately adjacent the flange and includes a bore 14 extending therethrough. The toggle retaining portion 18 will have two pair of generally elongated apertures 20 and 21 in quadrature about the periphery of the toggle retaining portion as shown in FIGS. 1 and 2, respectively. A pivotable toggle member 22 is retained in the body member by bosses 24 extending from opposing sides of the toggle and received in slots 20.

The preferred embodiment of the toggle is preferably of a generally rhomboidal configuration with shorter inclined end surfaces 28 and longer side surfaces 30. A threaded bore extends transversely of the toggle for association with a screw when the toggle has been pivoted to a position transverse of the body member. The pivot and retention bosses 24 may be elongated and for purposes to be described hereinafter are shown as rhomboidal in form with angled short side surfaces 32 extending generally parallel to side surfaces 28 of the toggle and with longer side surfaces 34 extending generally parallel to the side surfaces 30.

Attention is directed to the novel configuration of the slots 20 which receive the pivot bosses of the toggle. The slot 20 will include a plurality of axially spaced constrictions and enlargements alternately positioned throughout the length of the slot. Opposing shelf portions 40 extend inwardly and are inclined slightly downwardly forming a plurality of minimum transverse dimension areas in the slot. Edge wall portions 44 extend generally parallel to the axis of the body and intersect the shelf portions forming the areas of maximum transverse dimension in the slot. Intermediate camming surfaces 42 incline inwardly and upwardly from the enlarged areas of the slot to the next constricted area. It will be noted that the lower extremity 46 and upper extremity 48 of the slot both have a transverse dimension approximately that of the enlarged portions in the slot to allow a full range of pivoting areas and an area near the top of the slot which allows the toggle to be drawn fully upwardly.

The lower extremity of the body 70 may close both the pair of slots and be provided with a bore 72 extending generally along the axis of the body member.

In operation, the fastener device 10 will be inserted through a workpiece such as wall board which has been provided with an aperture 61 generally corresponding to the diameter of sleeve 16 but of less diameter than the diameter of the flange 12. The toggle will initially be positioned and confined generally longitudinally of the toggle retaining portion, as shown in FIGS. 1 and 2. One of the important aspects of the invention is the initial retention of the toggle in its longitudinal position and adjacent the sleeve 16. In the preferred embodiment, a pair of shelves 40' may be of such dimension that one of the plurality of constricted areas is of a transverse dimension even less than the remaining areas. The boss 24 will be positioned and snugly retained in a position longitudinal of the body between the points formed on the shelf 40'. To further aid in the temporary retention in the upward position, small notches 35 may be formed on the long sides of the boss for interengagement with the shelves 40'.

A fixture, such as 62, may be attached to the workpiece 60 by the insertion of a screw member 50 through a hole in the fixture, which is aligned with the bore 14 in the body member. As seen in FIG. 3, the tip of the screw 52 will contact inclined surfaces 28 on the toggle to rotate the toggle once its extremity has cleared the confines of the aperture 61. Due to the plurality of spaced enlargement portions, the pivot boss 24 will rotate within the slot at the next available position as it is forced downwardly by the screw. After the screw has released the toggle from its prepositionment between shelves 40', it will be located in a position transverse the body member. The rhomboidal configuration of the boss will insure that a corner of the boss contacts one of the shelves 40 to cam the toggle to its transverse positon. The shelves may be inclined slightly downwardly to aid in the camming of the boss as the screw continues to exert a force on the toggle and rotate it completely to a position perpendicular to the screw axis.

Since the length dimension of the boss is preferably greater than the transverse dimension of the slot in the constricted areas, the toggle will be positioned as shown in the dotted line configuration in FIG. 3 as being retained in a transverse position at the next available large area. In this fully transverse position, the threaded aperture 29 in the toggle will be aligned with the screw 50. Rotation of the screw thereupon mates the toggle with the screw enabling the screw to pull the toggle up into clamping position beneath the workpiece 60 since the toggle is restrained from relative rotation but generally free to move axially upwardly in the body.

FIG. 4 shows the fastening device in a final clamped position. The toggle 24 has been drawn up against the lower surface of the work-piece 60. Even though the boss will extend transversely of the slot, the camming surfaces 42 allow the toggle to be pulled up in a ratchet-like fashion through the constriction areas in order to tightly clamp against the workpiece. Due to the novel configuration of the slots, the boss will probably only be forced upwardly through one constricted area. However, it should be apparent that a workpiece thinner than that shown in the drawings will require that the toggle be pulled up even to the uppermost constricted area and into the enlarged extremity 48. It will also be noted that the body member is advantageously constructed of plastic to allow the body to be distended as the toggle is pulled up in its transverse position.

Because of the plurality of constriction areas, a fixture having a thickness much greater than that shown or much less can be attached using the same length of screw and still be able to completely activate the toggle since the toggle will rotate in the enlarged area that is next available to its point of retention near the upper extremity of the body member. The shelves 40 also insure that the toggle will be retained in its transverse position even after the screw is removed. This will enable the fixture 62 to be removed and replaced with confidence that the toggle is properly positioned and aligned to receive the screw member very close to the undersurface of the primary workpiece 60.

It should now be apparent that a fastening device has been provided which is capable of fastening a wide range of thicknesses of fixtures to an equally wide range of thicknesses of workpieces by the embodiments described herein which provides for the retention of the toggle in an uppermost longitudinal position of the fastener and which further provides for a plurality of alternating areas of constriction and enlargement to pivot and hold the toggle in a transverse position and as close a position as possible to the undersurface of the workpiece.

The embodiment in FIG. 6 shows that the boss 24a may alternatively be formed to have four equal sides with adjacent sides merging to form sharp corners capable of initiating and enhancing the rotation of the toggle upon contact with a shelf 40a. The corner to corner dimension of boss 24a should be aligned with the length dimension of the toggle and should be greater than the transverse dimension of the slot in the constriction area to provide the rotating and retention capabilities similar to the preferred embodiment.

The body member can also be modified by decreasing the transverse dimension of slot 21 in its upper extremity to provide a friction fit between the toggle and slot in that region. The toggle may thus be initially jammed up to a position similar to the position shown in FIG. 1 of the preferred embodiment.

What is claimed is:

1. A fastener device including a body member and toggle member, the body having a flange at one end and an elongated portion at the other end, the elongated portion of the body including a pair of opposing slots each slot having a plurality of constrictions formed therein to reduce the transverse dimension of the slot in a plurality of longitudinally spaced positions along the length of the body, the toggle member being elongated and including a pair of bosses received in the opposing slots to retain the toggle in the body member, camming means cooperating between the constrictions and the bosses permitting the toggle to move longitudinally of the body member in the direction toward the flange when the toggle is in a position longitudinally of the body but substantially restricting movement of the toggle in the opposite direction when the toggle is in a position transverse the body, means to retain the toggle at the uppermost extremity of the body against free longitudinal movement and in a position longitudinal of the body, the toggle element having a threaded aperture extending transversely thereof allowing the toggle to be retained in a position transverse to the body when associated with a mating screw member, means to rotate the toggle from its original longitudinal disposition to the transverse position, the bosses having a dimension greater than the transverse dimension of the slot in the vicinity of the abutments when the toggle is in a position transverse the body to retain the toggle in the transverse position at a predetermined level on the body portion.

2. A fastener device in accordance with claim 1, wherein the bosses are elongated having a length disposed in the direction of the length of the toggle member.

3. A fastener device in accordance with claim 1, wherein the extremities of the toggle member include camming surfaces presenting inclined abutment surfaces when the toggle member is disposed longitudinally within the body member.

4. A fastener device in accordance with claim 1, wherein the bosses are rhomboidal in form.

5. A fastener device in accordance with claim 1, wherein the toggle element is rhomboidal in form.

6. A fastener device in accordance with claim 1, wherein the bosses are in the form of elongated parallelograms with the longest sides including notches for locking association with and between a pair of abutments to initially retain the toggle in a position longitudinal and at the uppermost extremity of the body.

7. A fastener device in accordance with claim 1, wherein the bosses are formed by a figure with four equal sides and four corners, the corner to corner dimension of the bosses being aligned with the length dimension of the toggle.

8. A fastener device including a body member and toggle member, the body having a flange at one end and an elongated portion at the other end, the elongated portion of the body including a pair of opposing slots each slot having a plurality of abutments formed therein to restrict the transverse dimension of the slot in a plurality of longitudinally spaced positions along the length of the body, the toggle member being elongated and including a pair of bosses received in the opposing slots to retain the toggle in the body member, means to retain the toggle at the uppermost extremity of the body against free longitudinal movement and in a position longitudinal of the body, the toggle element having a threaded aperture extending transversely thereof allowing the toggle to be retained in a position transverse to the body when associated with a mating screw member, means to rotate the toggle from its original longitudinal disposition to the transverse position, the bosses having a dimension greater than the transverse dimension of the slot in the vicinity of the abutments when the toggle is in a position transverse the body to retain the toggle in the transverse position at a predetermined level on the body portion, said abutments comprising opposing shelf surfaces extending from the edges of the slots and intersecting with upwardly and inwardly converging surfaces formed in the slots to allow the toggle to be moved longitudinally of the body in the direction toward the flange but be substantially restricted from movement in the opposite direction when the toggle is in a position transverse the body.

9. A fastener device in accordance with claim 8, wherein the bosses are elongated and are initially retained in the upper extremities of the slots by the edges of a pair of opposing shelf surfaces the width of the bosses being slightly greater than the distance between the edges.

10. A fastener device including a body member and toggle member, the body having a flange at one end and an elongated portion at the other end, the elongated portion of the body including a pair of opposing slots each slot having a plurality of abutments formed therein to restrict the transverse dimension of the slot in a plurality of longitudinally spaced positions along the length of the body, the toggle member being elongated and including a pair of bosses received in the opposing slots to retain the toggle in the body member, means to retain the toggle at the uppermost extremity of the body against free longitudinal movement and in a position longitudinal of the body, the toggle element having a threaded aperture extending transversely thereof allowing the toggle to be retained in a position transverse to the body when associated with a mating screw member, means to rotate the toggle from its original longitudinal disposition to the transverse position, the bosses having a dimension greater than the transverse dimension of the slot in the vicinity of the abutments when the toggle is in a position transverse the body to retain the toggle in the transverse position at a predetermined level on the body portion, said bosses being elongated and initially retained in the upper extremity of the slots by a friction fit between inwardly extending portions of the upper extremity of the slots.

11. A fastener device including a body member and toggle member, the body having a flange at one end and an elongated portion at the other end, the elongated portion of the body including a pair of opposing slots each slot having a plurality of abutments formed therein to restrict the transverse dimension of the slot in a plurality of longitudinally spaced positions along the length of the body, the toggle member being elongated and including a pair of bosses received in the opposing slots to retain the toggle in the body member, means to retain the toggle at the uppermost extremity of the body against free longitudinal movement and in a position longitudinal of the body, the toggle element having a threaded aperture extending transversely thereof allowing the toggle to be retained in a position transverse to the body when associated with a mating screw member, means to rotate the toggle from its original longitudinal disposition to the transverse position, the bosses having a dimension greater than the transverse dimension of the slot in the vicinity of the abutments when the toggle is in a position transverse the body to retain the toggle in the transverse position at a predetermined level on the body portion, said means for retaining the toggle against free longitudinal movement includes at least one pair of opposing abutments compressively engaging opposing sides of the bosses.

12. A fastener device for clamping opposite surfaces of a workpiece having an aperture therein, including an elongated hollow body member having a flange at one extremity, an elongated toggle element positioned within the body and including a pair of pivot and retention bosses extending from opposite sides thereof, the hollow body member including two pair of elongated apertures extending generally parallel to the axis of the body member, a first pair of apertures being of a width approximately the width of the toggle element to allow the toggle to be rotated about the bosses to a position transverse of the body member, the second pair of elongated apertures receiving the bosses for pivotal and longitudinal movement therein and including a plurality of alternating constriction and enlargement portions throughout the extent of the slot, the bosses being elongated and having their lengths disposed in the same direction as the length of the toggle element, the enlargement portions of slots having a dimension transverse the slot at least as great as the length of the boss to allow the boss to rotate therein, the constriction portions being of dimension transverse the slot which is less than the length of the boss to prevent free movement of the toggle element longitudinally of the body member when said toggle element is in a position transverse the body member, the toggle element including a threaded aperture generally perpendicular to the length of the toggle and also including camming means on at least one extremity thereof operative to rotate the toggle about the bosses when a screw member is inserted through one extremity of the body and into contact with the camming means, said constriction portions of the second apertures comprising pairs of directly opposite shelves extending from the edges of the apertures and presenting abutment surfaces in planes transverse to the longitudinal axis of the body member to preclude longitudinal movement in a direction away from the flange of the toggle when it is positioned transverse the body.

13. A fastener device in accordance with claim 12, wherein the enlargement portions of the second apertures include opposing edges of the slot extending a predetermined axial extent parallel to the longitudinal axis of the body merging with inwardly inclined camming surfaces extending upwardly towards the flange from an area of maximum width of the aperture to the constriction portion so that the toggle may be pulled up toward the flange when the toggle is positioned transverse the body.

14. A fastener device in accordance with claim 12, wherein the directly opposing shelves are inclined in a direction away from the flange extremity at small angles to planes perpendicular to the longitudinal axis of the body member.

15. A fastener device in accordance with claim 12, wherein the extremity of the second pair of apertures nearest the flange is of a width at least as great as the length of the bosses.

16. A fastener device in accordance with claim 12, wherein the extremity of the second pair of apertures opposite the flange extremity of the body is of a width at least as great as the length of the bosses.

17. A fastener device in accordance with claim 12, wherein the second pair of apertures include means to retain the elongated toggle element at the uppermost position of the body and longitudinally thereof.

18. A fastener device in accordance with claim 12, wherein the body member is made from a resilient plastic material.

19. A fastener device in accordance with claim 12, wherein the toggle element is rhomboidal in form with the inclined end surfaces comprising the means to rotate the toggle in response to axial force from the screw member.

20. A fastener device in accordance with claim 12, wherein the bosses are rhomboidal in form.

21. A fastener device in accordance with claim 12, wherein the width of the first pair of apertures at their upper extremities is such as to provide a friction fit between the toggle and the body to initially retain the toggle longitudinally of the body and in the upper extremity thereof.

* * * * *